(12) United States Patent
Uramachi (10) Patent No.: US 6,679,113 B2
(45) Date of Patent: Jan. 20, 2004

(54) FLOW RATE SENSOR HAVING A TERMINAL PROTECTING WALL

(75) Inventor: Hiroyuki Uramachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/227,428

(22) Filed: Aug. 26, 2002

(65) Prior Publication Data

US 2003/0074963 A1 Apr. 24, 2003

(30) Foreign Application Priority Data

Oct. 22, 2001 (JP) ........................................ 2001-323181

(51) Int. Cl.[7] .............................................. G01F 1/68
(52) U.S. Cl. .................................. 73/204.22; 73/204.26
(58) Field of Search .......................... 73/204.26, 204.22, 73/202.5

(56) References Cited

U.S. PATENT DOCUMENTS 5,396,795 A * 3/1995 Araki ...................... 73/204.26
6,176,131 B1 * 1/2001 Hecht et al. ............. 73/204.26
6,393,907 B1 * 5/2002 Yamakawa et al. ...... 73/204.26
6,470,743 B2 * 10/2002 Yonezawa et al. ....... 73/204.26

FOREIGN PATENT DOCUMENTS

JP          2000-002572          7/2000

* cited by examiner

*Primary Examiner*—Harshad Patel
(74) *Attorney, Agent, or Firm*—Sughrue Mion, PLLC (57) ABSTRACT

A frame-shaped peripheral wall member is disposed on a holder so as to surround an electrical connection portion between a terminal and a flow rate detecting element, a bottom surface of the peripheral wall member being secured by bonding to the holder and the flow rate detecting element by a heat-curing addition-reaction silicone adhesive. A heat-curing addition-reaction gel containing a fluorine resin as a major constituent is injected and cured inside the peripheral wall member so as to embed the electrical connection portion.

14 Claims, 7 Drawing Sheets

FLOW RATE SENSOR HAVING A TERMINAL PROTECTING WALL

BACKGROUND OF THE INVENTION

1. Field of the Invention

The present invention relates to a flow rate sensor for outputting a signal in response to a flow rate of a fluid being measured, and relates to a flow rate sensor suitable for measuring an intake air flow rate of an internal combustion engine in an automobile, for example.

2. Description of the Related Art

Generally, in an automotive engine, etc., an air-fuel mixture including fuel and intake air is burnt in a combustion chamber in the engine body, and rotational output from the engine is extracted from the resulting combustion pressure, requiring that the intake air flow rate be detected in order to calculate the injection rate, etc., of the fuel with high precision.

Thus, the flow rate sensor shown in Japanese Patent Non-Examined Laid-Open No. 2000-2572, for example, is known as a conventional technique of this kind.

Figure 6:
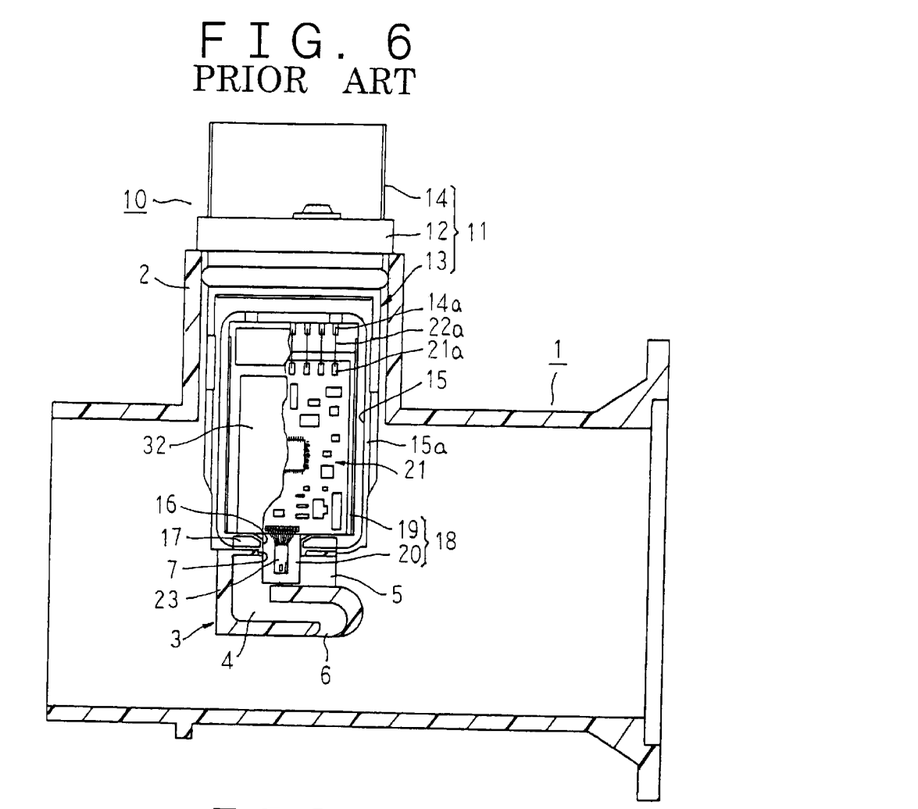
FIG. 6 is a longitudinal section showing a conventional flow rate sensor mounted to a main passage.
Figure 7:
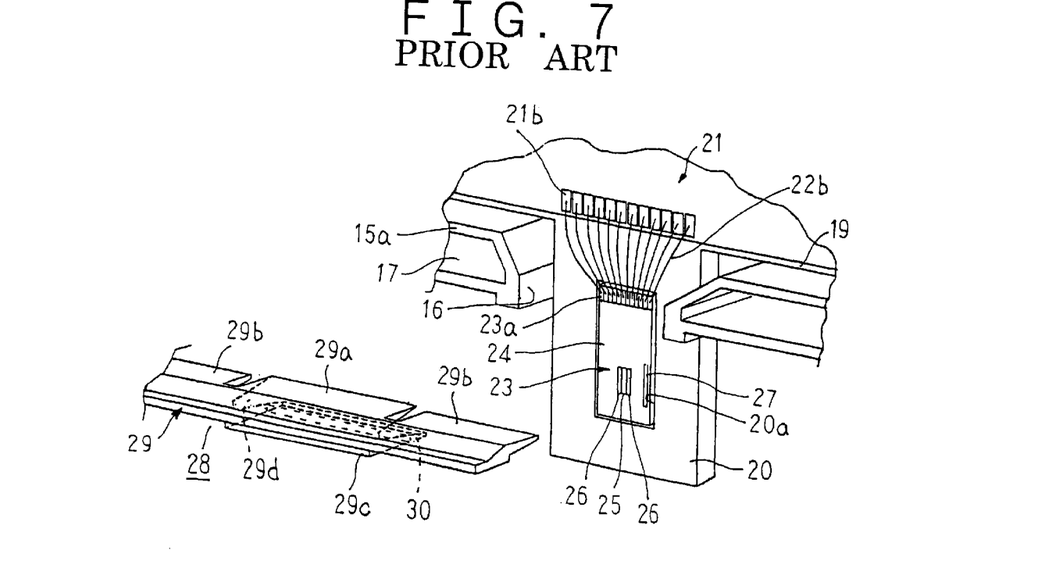
FIG. 7 is a partial perspective showing an assembly process for the conventional flow rate sensor.
Figure 8:
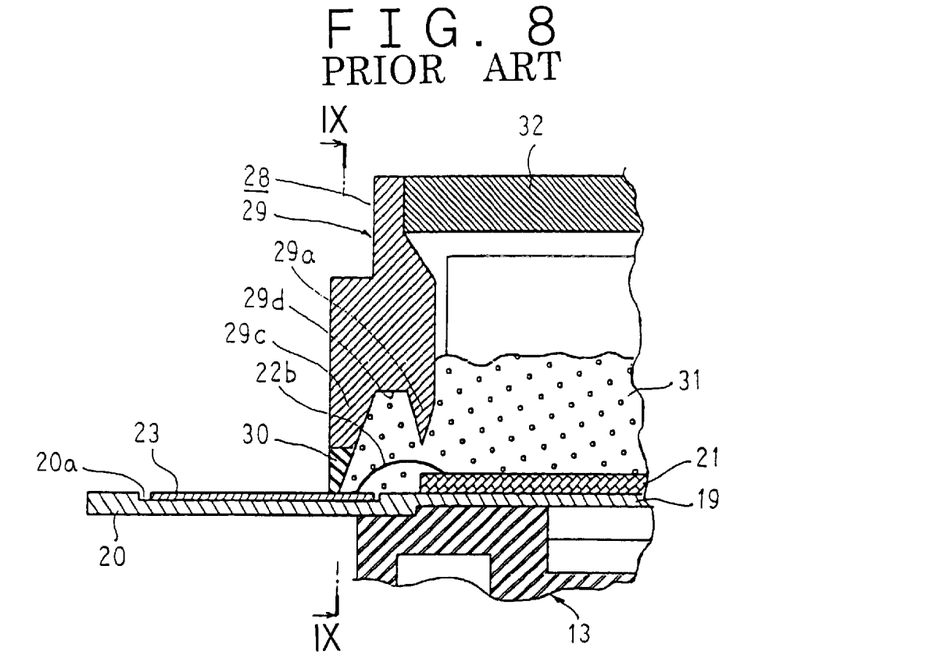
FIG. 8 is an enlarged partial longitudinal section of the conventional flow rate sensor.
Figure 9:
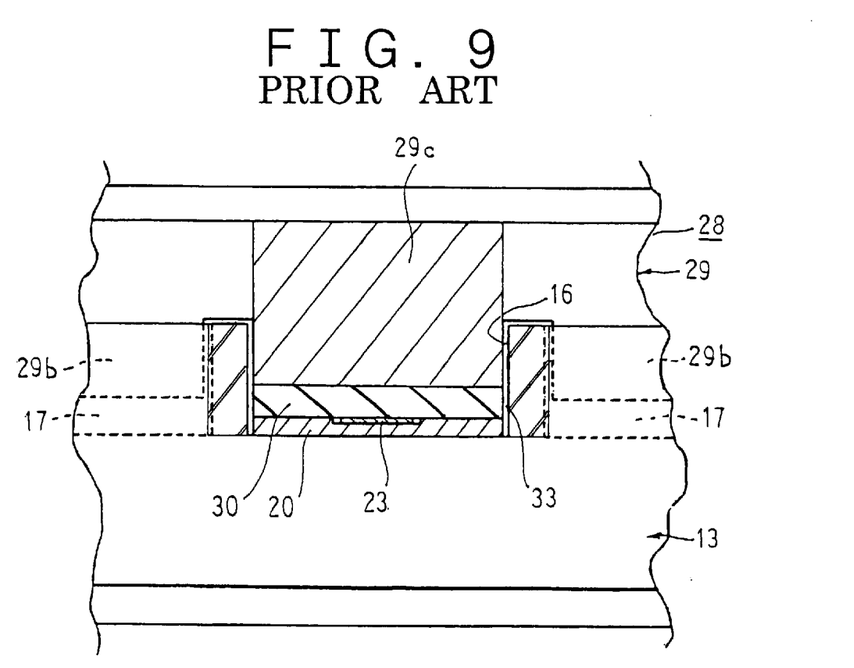
FIG. 9 is a cross section taken along line IX—IX in FIG. 8 viewed from the direction of the arrows.

FIG. 6 is a longitudinal section showing a conventional flow rate sensor such as described in Japanese Patent Non-Examined Laid-Open No. 2000-2572, for example, mounted to a main passage, FIG. 7 is a partial perspective showing an assembly process for the conventional flow rate sensor, FIG. 8 is an enlarged partial longitudinal section of the conventional flow rate sensor in FIG. 6, and FIG. 9 is a cross section taken along line IX—IX in FIG. 8 viewed from the direction of the arrows.

In the figures, a main passage 1 is formed into a cylindrical shape from, for example, a resin material, a metal material, etc., a small-diameter cylindrical mounting aperture 2 being disposed so as to project radially outward, and a passage forming body 3 having a vertically-aligned rectangular body being disposed so as to project radially inward from an inner wall surface of the main passage 1. A bypass passage 4 is formed into a general U shape inside this passage forming body 3, an inflow aperture 5 of the bypass passage 4 opening onto the vicinity of the axial center of the main passage 1 on a front surface of the passage forming body 3, and an outflow aperture 6 of the bypass passage 4 opening onto the main passage 1 on a lower surface of the passage forming body 3. In addition, an element insertion aperture 7 is formed in the passage forming body 3 at a position facing the mounting aperture 2.

A flow rate sensor 10 is constituted by a casing 11, a mount plate 18, a circuit board 21, a flow rate detecting element 23, etc.

The casing 11 is formed into a stepped cylindrical shape from a resin material, for example, and is constituted by: a collar-shaped mount portion 12 formed on a base end portion of the casing; a circuit accommodating portion 13 formed into a generally rectangular overall box shape and is disposed so as to extend to a first side of the mount portion 12; and a connector portion 14 formed on a second side of the mount portion 12, the connector portion sending and receiving signals to and from an external portion. A circuit board mount recess portion 15 surrounded by a peripheral wall 15a forming a rectangular shape, a mount plate interfitting groove 16 formed by cutting away a portion of the peripheral wall 15a at an extremity of the casing 11, and interfitting apertures 17 formed so as to be positioned on first and second sides of the mount plate interfitting groove 16 are disposed in the circuit accommodating portion 13.

The mount plate 18 is formed into a plate-shaped body from a metal material, for example, being composed of: a circuit board mount portion 19 formed by bending edge portions of the mount plate 18 on the left and right in FIG. 6; and an element mount portion 20 formed integrally at an extremity of the circuit board mount portion 19. A rectangular element accommodating recess portion 20a for accommodating the flow rate detecting element 23 is formed in this element mount portion 20. This mount plate 18 is mounted to the casing 11 by housing the circuit board mount portion 19 inside the circuit board mount recess portion 15 such that the element mount portion 20 fits into the mount plate interfitting groove 16. Here, an extremity of the element mount portion 20 projects from the casing 11.

The circuit board 21 is disposed on the circuit board mount portion 19, electronic components for sending and receiving electric signals to and from the flow rate detecting element 23 being mounted to the circuit board 21. First circuit board terminals 21a of the circuit board 21 and connector terminals 14a of the connector portion 14 are each electrically connected by first bonding wires 22a.

The flow rate detecting element 23, as shown in FIG. 7, is provided with: a rectangular silicon substrate 24; a heater resistor 25 formed on a surface of the silicon substrate 24; a pair of temperature-detecting resistors 26 formed on the surface of the silicon substrate 24 so as to be positioned to the left and right of the heater resistor 25; and a temperature-compensating resistor 27 formed on the surface of the silicon substrate 24, the flow rate detecting element 23 being disposed inside the element accommodating recess portion 20a. Second circuit board terminals 21b of the circuit board 21 and element terminals 23a of the flow rate detecting element 23 are each electrically connected by second bonding wires 22b.

Moreover, the heater resistor 25, the temperature-detecting resistors 26, and the temperature-compensating resistor 27 are electrically connected to each of the element terminals 23a by a wiring pattern (not shown) formed on the surface of the silicon substrate 24. Furthermore, the electronic components mounted to the circuit board 21 constitute a heater control circuit for controlling the heater resistor 25 of the flow rate detecting element 23, an amplifying circuit for amplifying detection signals from each of the temperature-detecting resistors 26, a reverse-current sensing circuit, etc.

A stopper member 28 is constituted by a stopper main body 29 and an elastic protrusion 30. The stopper main body 29, as shown in FIG. 7, is formed by: an elongated plate portion 29a extending flatly so as to lie across the mount plate interfitting groove 16; interfitting protrusions 29b positioned on left and right sides of the elongated plate portion 29a so as to project toward the interfitting apertures 17 of the circuit accommodating portion 13 and fit into the interfitting apertures 17; a central protrusion 29c positioned between the interfitting protrusions 29b so as to fit into the mount plate interfitting groove 16 and, as shown in FIG. 8, extend to a position in proximity to the second bonding wires 22b; and a stopper recess portion 29d formed between the elongated plate portion 29a and the central protrusion 29c. The elastic protrusion 30 is composed of a flexible elastic material such as silicone rubber, for example, and is fixed to a leading edge portion of the central protrusion 29c. The stopper member 28 is mounted to the casing 11 such that the interfitting protrusions 29b fit into the interfitting apertures 17. Here, the elastic protrusion 30, as shown in FIG. 8, is placed in contact with a surface of the flow rate detecting element 21 in an elastically-deformed state.

A sealant 31 is formed from a silicone gel, for example, and is injected inside of circuit board mount recess portion 15, as shown in FIGS. 6 and 8, so as to cover the surface of the circuit board 21, the bonding wires 22a and 22b, and the connector and element terminals 14a and 23a. Hence, short-circuiting of the bonding wires 22a and 22b is prevented and the electronic components mounted to the circuit board 21 are protected.

A cover body 32 is mounted to the casing 11 such that a peripheral portion thereof is fixed by adhesive to the peripheral wall 15a of the circuit board mount recess portion 15 and the stopper main body 29. Hence, the circuit board mount recess portion 15 is sealed over, and the stopper member 28 is held with the elastic protrusion 30 placed in contact with the surface of the flow rate detecting element 21 in an elastically-deformed state.

The flow rate sensor 10 constructed in this manner is mounted so as to project inside the main passage 1 from the mounting aperture 2. At this time, the element mount portion 20 of the flow rate sensor 10 is inserted inside the element insertion aperture 7, and the flow rate detecting element 23 is disposed inside the bypass passage 4.

This main passage 1 is connected partway along an air intake pipe of the engine, an air cleaner (not shown) being connected to a first end thereof, and an air intake manifold communicating with the inside of cylinders of the engine (not shown) being connected by means of a throttle valve, etc., (not shown) to a second end. Air cleaned by the air cleaner flows through the inside of the main passage 1 from right to left in FIG. 6, is directed inside the bypass passage 3 through the inflow aperture 5, flows over the surface of the flow rate detecting element 23 (the silicon substrate 24), then flows out into the main passage 1 through the outflow aperture 6.

A heating current which flows through the heater resistor 25 is controlled by a circuit constructed on the circuit board 21 such that the average temperature of the heater resistor 25 is higher than the temperature of air detected by the temperature-compensating resistor 27 by a predetermined amount. Hence, the flow rate of the air is detected by making use of the cooling effect the flow of air exerts on the heater resistor 25 and changes in the resistance values of each of the temperature-detecting resistors 26.

Because the conventional flow rate sensor 10 is constructed in the above manner, the stopper member 28 has a complex three-dimensional shape and the portion of the stopper member 28 placed in contact with the flow rate detecting element 23 is minute. Thus, one problem has been that forming the elastic protrusion 30 composed of an elastic material such as a silicone rubber, etc., only on the portion of the stopper member 28 to be placed in contact with the flow rate detecting element 23 requires that the dimensions of the elastic protrusion 30 be controlled with high precision and that the stopper main body 29 and the elastic member 30 be aligned with high precision, causing mass production to deteriorate, thereby increasing production costs.

The central protrusion 29c and the recess portion 29d which are formed into the stopper main body 29 have the effect of preventing pressure resulting when the sealant 31 is injected inside the circuit board mount recess portion 15 from acting directly on the elastic protrusion 30. However, air accumulates inside the recess portion 29d easily when the sealant 31 is injected. When air pockets form in the recess portion 29d, the second bonding wires 22b are partially exposed, and so another problem has been that short-circuiting occurs between the second bonding wires 22b.

Thus, to eliminate these air pockets, a process has been required for removing the air from the air pockets by evacuating the ambient atmosphere from the casing 11 during the injection of the sealant 31 or before heat curing of the sealant 31, and so another problem has been that the number of work processes is increased, raising production costs.

As shown in FIG. 9, slight gaps 33 arise between the elongated plate portion 29a of the stopper main body 29 and the mount plate interfitting groove 16. A silicone gel is generally used for the sealant 31. This silicone gel is initially a liquid and becomes a gel on heat curing. Consequently, even if the gaps 33 are ideally reduced by controlling the dimensions of the elongated plate portion 29a and the mount plate interfitting groove 16 with high precision, the liquid silicone gel applied to cover the circuit board 21, etc., leaks out easily through the gaps 33 during heat curing. In addition, when a large amount of air flows through the main passage 1, pressure in the main passage 1 drops, giving rise to a pressure difference between the inside of the circuit board mount recess portion 15 sealed over by the cover body 32 and the inside of the main passage 1, and the silicone gel in cured gel form is sucked out through the gaps 33 due to this pressure difference and leaks out.

The flow rate detecting element 23 is accommodated inside the element accommodating recess portion 20a and secured by an adhesive to the element mount portion 20, but an epoxy adhesive is generally used for the adhesive bonding the flow rate detecting element 23 to the element mount portion 20. Many epoxy adhesives of this kind contain amine substances as curing agents or catalysts. On the other hand, "addition-reaction" silicone gels which cure by an addition reaction between vinyl groups and silane (SiH) groups using a platinum catalyst are used for the sealant 31. In that case, since the amine substances contained in the epoxy adhesive coordinate more strongly with the platinum catalyst than the vinyl groups during the heat curing of the silicone gel (the sealant 31), the amine substances act to inhibit curing of the silicone gel. As a result, the silicone gel in the region coming into contact with the epoxy adhesive is not cured, but instead remains in an oily state. Thus, silicone gel in oil form leaks out from the gaps 33 during and after curing of the silicone gel.

"Condensation-reaction" silicone rubbers which generally cure by a condensation reaction with moisture contained in the air are used for the elastic member 30. These condensation-reaction silicone rubbers contain organometallic salts and organic peroxides. When the addition-reaction silicone gel used as the sealant 31 is heat cured, the organometallic salts and the organic peroxides contained in the silicone rubber act to inhibit curing of the silicone gel (the sealant 31) since the organometallic salts and the organic peroxides coordinate more strongly with the platinum catalyst than the vinyl groups. As a result, the silicone gel in the region coming into contact with the silicone rubber is not cured, but instead remains in an oily state. Thus, silicone gel in oil form leaks out from the gaps 33 during and after curing of the silicone gel.

In order to ensure gel properties, the silicone gel initially contains a comparatively large amount of oil components not contributed to curing. As a result, the oil components leak out from the gaps 33 during and after curing of the silicone gel.

Hence, in the conventional flow rate sensor 10, the silicone gel and the oil components contained in the silicone gel leak out through the gaps 33 and adhere to the flow rate detecting element 23.

Because this kind of flow rate sensor is a thermosensitive flow rate sensor making use of heat transfer characteristics by which heat generated in the heater resistor 25 is lost to the fluid being measured (here, the air) from the surface of the flow rate detecting element 23, another problem has been that the heat transfer characteristics are changed significantly by the silicone gel and the oil components contained in the silicone gel adhering to the flow rate detecting element 23, making accurate flow rate detection impossible.

Silicone gel which has adhered once is heat cured by the heat from the heater resistor 25, adhering firmly to the flow rate detecting element 23. Thus, another problem has been that the flow rate detection characteristics of the flow rate sensor are changed with the passage of time by the silicone gel which adheres firmly to the flow rate detecting element 23, making accurate flow rate detection impossible, and tracking by the detection signal of changes in the flow rate of the fluid being measured significantly deteriorates, making responsiveness as a flow rate sensor poor.

SUMMARY OF THE INVENTION

The present invention aims to solve the above problems and an object of the present invention is to provide a flow rate sensor enabling accurate flow rate detection and also enabling deterioration in responsiveness to be suppressed by preventing a sealant sealing an electrical connection portion from leaking out and adhering to a flow rate detecting element.

With the above in view, a flow rate sensor of the present invention includes a holder at a first end of which a flat detector auxiliary portion is formed integrally, a flat flow rate detecting element for detecting a flow rate of a fluid being measured and a circuit board to which a control circuit for controlling an electric current flowing to the flow rate detecting element is mounted. An element accommodating recess portion is formed in a major surface of the detector auxiliary portion. The flow rate detecting element is mounted to the holder so as to be housed inside the element accommodating recess portion such that a major surface of the flow rate detecting element is positioned in a common plane with a major surface of the detector auxiliary portion. A terminal is built into the holder such that a second end of the terminal is electrically connected to the circuit board. A first end of the terminal is positioned in a common plane with the major surface of the detector auxiliary portion and extends onto the detector auxiliary portion. A frame-shaped peripheral wall member is mounted to the holder so as to surround an electrical connection portion formed by electrically connecting an electrode portion formed at a first end of the terminal of the flow rate detecting element and the first end of the terminal. A heat-curing addition-reaction sealant is injected inside the peripheral wall member so as to embed the electrical connection portion. A bottom surface of the peripheral wall member is secured by bonding to the detector auxiliary portion and the flow rate detecting element by an elastic adhesive.

Therefore, because the chemical resistance and environmental tolerance of the sealant are superior and leakage of the sealant resulting from aging is prevented, a flow rate sensor enabling accurate flow rate detection and also enabling deterioration in responsiveness to be suppressed is achieved.

With the above in view, a flow rate sensor of the present invention includes a holder at a first end of which a flat detector auxiliary portion is formed integrally, a flat flow rate detecting element for detecting a flow rate of a fluid being measured and a circuit board to which a control circuit for controlling an electric current flowing to the flow rate detecting element is mounted. An element accommodating recess portion is formed in a major surface of the detector auxiliary portion. The flow rate detecting element is mounted to the holder so as to be housed inside the element accommodating recess portion such that a major surface of the flow rate detecting element is positioned in a common plane with a major surface of the detector auxiliary portion. A terminal is built into the holder such that a second end of the terminal is electrically connected to the circuit board. A first end of the terminal is positioned in a common plane with the major surface of the detector auxiliary portion and extends onto the detector auxiliary portion. A frame-shaped peripheral wall member is mounted to the holder so as to surround an electrical connection portion formed by electrically connecting an electrode portion formed at a first end of the terminal of the flow rate detecting element and the first end of the terminal. A sealant is injected inside the peripheral wall member so as to embed the electrical connection portion. The sealant is constituted by a heat-curing addition-reaction gel or rubber containing a fluorine resin as a major constituent.

Therefore, because the chemical resistance and environmental tolerance of the sealant are superior and leakage of the sealant resulting from aging is prevented, a flow rate sensor enabling accurate flow rate detection and also enabling deterioration in responsiveness to be suppressed is achieved.

DETAILED DESCRIPTION OF THE PREFERRED EMBODIMENTS

The preferred embodiments of the present invention will now be explained with reference to the drawings.

Embodiment 1

Figure 1:
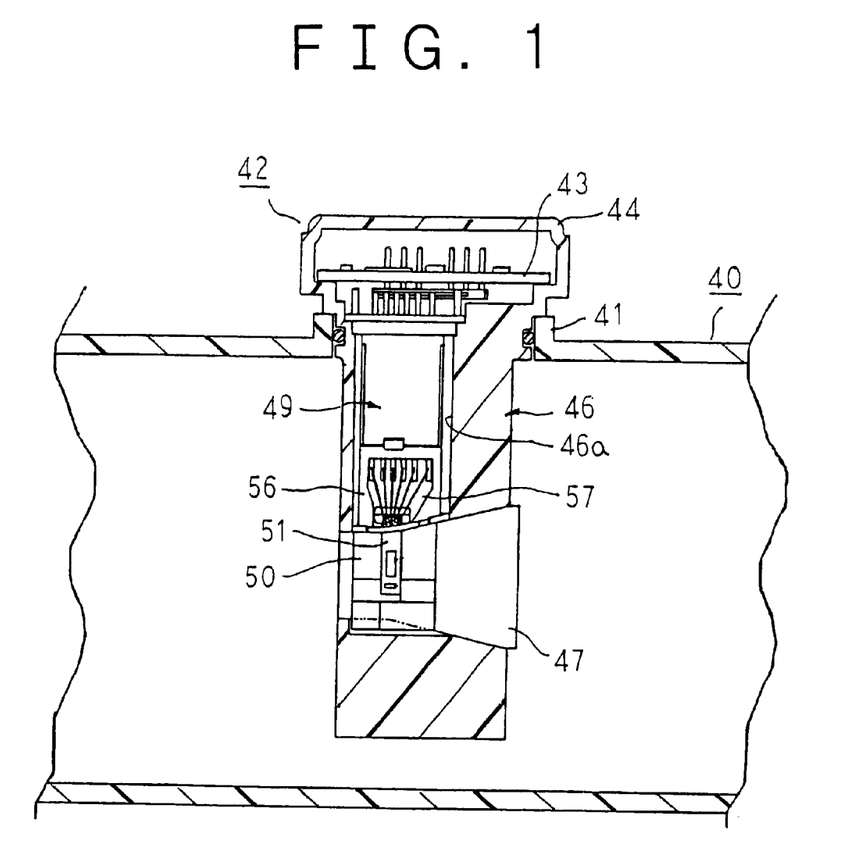
FIG. 1 is a longitudinal section showing a flow rate sensor according to Embodiment 1 of the present invention incorporated into a main passage.
Figure 2:
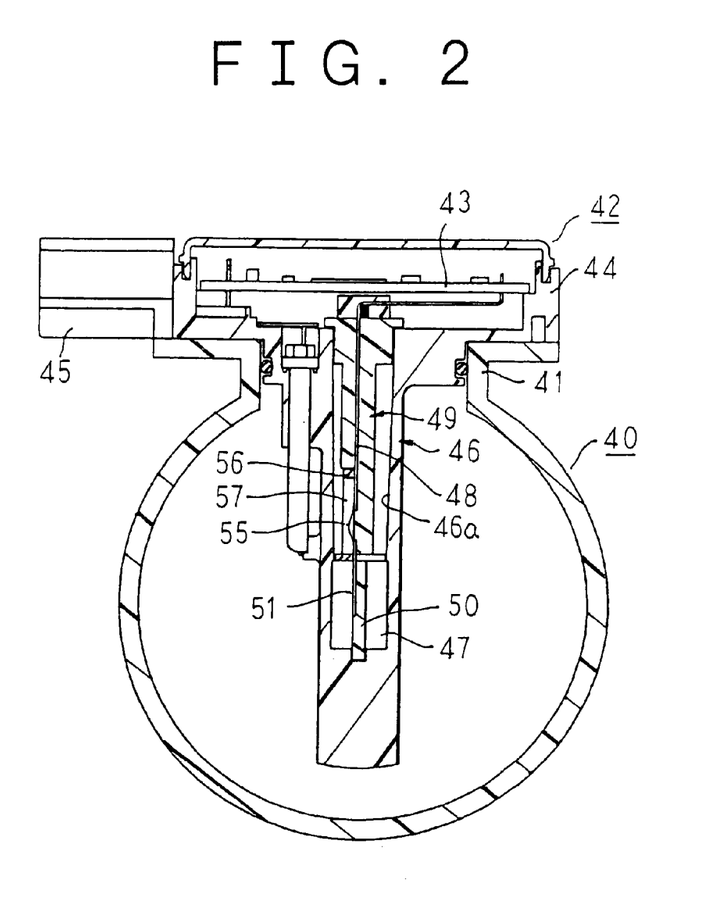
FIG. 2 is a cross section showing the flow rate sensor according to Embodiment 1 of the present invention incorporated into the main passage.
Figure 3:
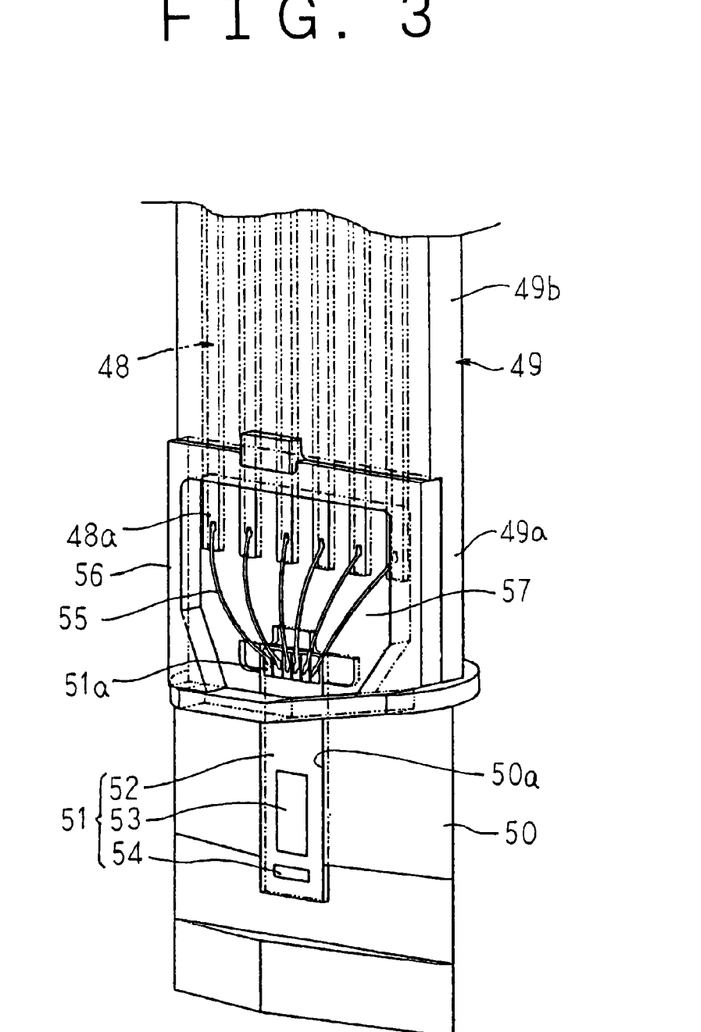
FIG. 3 is a an enlarged partial perspective showing an electrical connection portion of a flow rate detecting element in the flow rate sensor according to Embodiment 1 of the present invention in an unsealed state.
Figure 4:
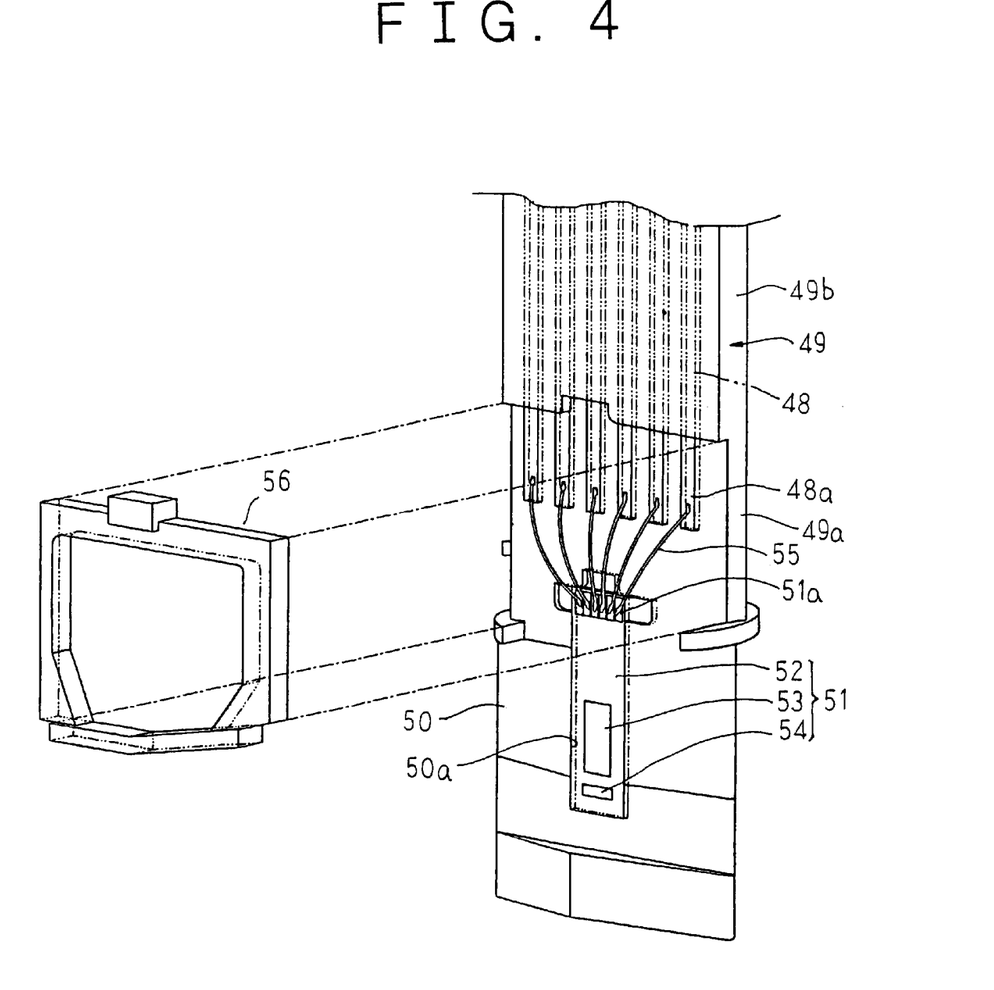
FIG. 4 is an enlarged partial perspective explaining a method for mounting a peripheral wall member to the electrical connection portion of the flow rate detecting element in the flow rate sensor according to Embodiment 1 of the present invention.
Figure 5:
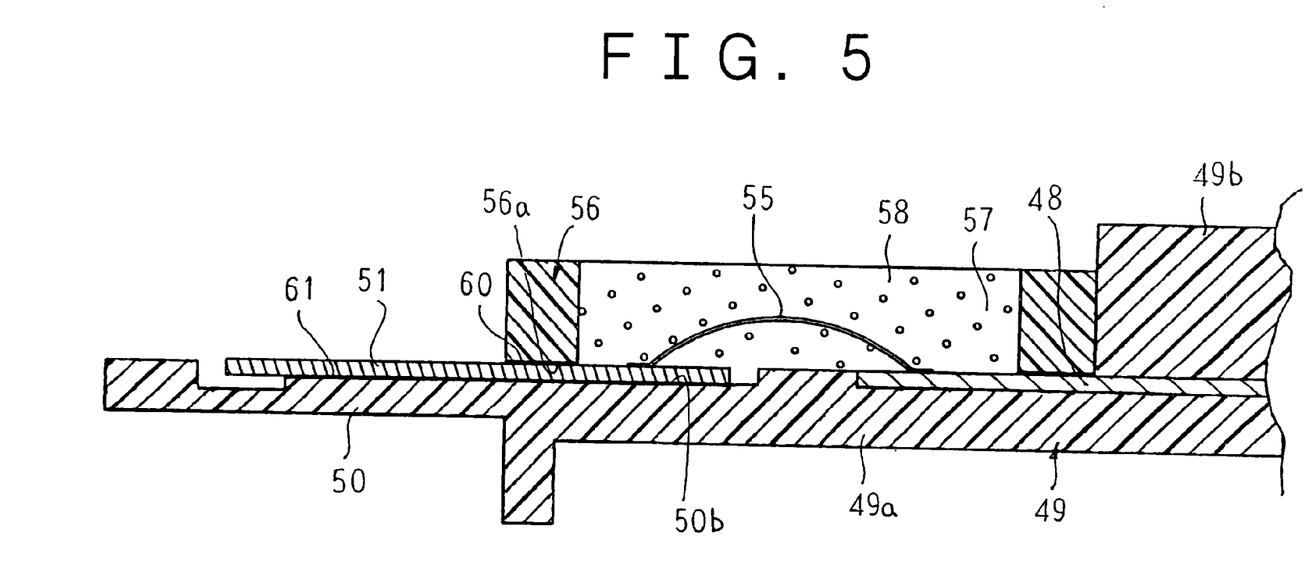
FIG. 5 is a partial cross section showing the vicinity of the electrical connection portion of the flow rate detecting element in the flow rate sensor according to Embodiment 1 of the present invention.

FIGS. 1 and 2 are a longitudinal section and a cross section, respectively, showing a flow rate sensor according to Embodiment 1 of the present invention incorporated into a main passage, FIG. 3 is an enlarged partial perspective showing an electrical connection portion of a flow rate detecting element in the flow rate sensor according to Embodiment 1 of the present invention in an unsealed state, FIG. 4 is an enlarged partial perspective explaining a method for mounting a peripheral wall member to the electrical connection portion of the flow rate detecting element in the flow rate sensor according to Embodiment 1 of the present invention, and FIG. 5 is a partial cross section showing the vicinity of the electrical connection portion of the flow rate detecting element in the flow rate sensor according to Embodiment 1 of the present invention.

In the figures, a main passage 40 is a cylindrical pipe body through which a fluid being measured flows, a mounting aperture 41 being formed into a portion of a peripheral wall of the main passage 40. Moreover, in the case of an automotive internal combustion engine, this main passage 40 is prepared integrally with an air cleaner (not shown) using a resin, for example, and is connected partway along an air intake pipe of the engine, the air cleaner being disposed on an air intake side, and an air intake manifold communicating with the inside of cylinders of the engine (not shown) being connected by means of a throttle valve, etc., (not shown) to a second end of the main passage 40. In that case, the fluid being measured is air.

A flow rate sensor 42 includes: a circuit board 43 to which electronic components are mounted; a circuit case 44 for accommodating the circuit board 43; a connector 45 for supplying electric power to the flow rate sensor 42 and extracting a detected flow rate signal from the flow rate sensor 42 to an external portion; a columnar member 46 projecting to a first side from the circuit case 44, a detector passage 47 through which a fluid being measured flows being formed in the columnar member 46; a holder 49 in which metal insert-molded terminals 48 are insert molded disposed inside the columnar member 46; a flat detector auxiliary portion 50 formed integrally in a first end of this holder 49; a flow rate detecting element 51 mounted to this detector auxiliary portion 50; a peripheral wall member 56 mounted to the holder 49 so as to surround an electrical connection portion 57 connecting the insert-molded terminals 48 and the flow rate detecting element 51; and a sealant 58 injected inside the peripheral wall member 56 to embed the electrical connection portion 57.

The circuit case 44, the connector 45, and the columnar member 46 are formed integrally using a resin such as polybutylene terephthalate, for example. A holder accommodating aperture 46a for accommodating the holder 49 is formed in the columnar member 46 so as to communicate between the circuit case 44 and the detector passage 47.

The holder 49 is formed into a flat, elongated, stepped shape having a thin portion 49a at a first end using a resin such as polybutylene terephthalate, for example, first ends of the insert-molded terminals 48 projecting onto the thin portion 49a from a thick portion 49b such that surfaces of the insert-molded terminals 48 are positioned in a common plane with a major surface of the thin portion 49a. The flat detector auxiliary portion 50 is disposed so as to extend from the first end of the thin portion 49a of the holder 49 so as to be positioned in a common plane with the major surface of the thin portion 49a. A rectangular element accommodating recess portion 50a for accommodating the flow rate detecting element 51 is formed in a major surface of the detector auxiliary portion 50.

The flow rate detecting element 51 is provided with: a rectangular silicon substrate 52; and a flow rate detection resistor 53 and a temperature-compensating resistor 54 formed by patterning a platinum film coated onto a major surface of the silicon substrate 52, the flow rate detecting element 51 being accommodated inside the element accommodating recess portion 50a so as to be positioned in a common plane with the major surface of the detector auxiliary portion 50, a rear surface of the flow rate detecting element 51 being secured by bonding to a bottom surface 50b of the element accommodating recess portion 50a by an epoxy adhesive 61 using a phenol curing agent. Element terminals 51a functioning as electrode portions of the flow rate detecting element 51 and projecting ends 48a of the insert-molded terminals 48 are each electrically connected by bonding wires 55.

The peripheral wall member 56 is formed into a substantially rectangular frame shape using a resin such as polybutylene terephthalate, for example, a bottom surface 56a thereof being formed into a flat surface constituting a bonding surface. This peripheral wall member 56 is placed on the holder 49 so as to surround the electrical connection portion 57 which is constructed by electrically connecting each of the element terminals 51a and the projecting ends 48a of the insert-molded terminals 48 by the bonding wires 55, the bottom surface 56a of the peripheral wall member 56 being secured by bonding to the major surfaces of the thin portion 49a which is a portion of the holder 49 and the detector auxiliary portion 50 and the major surface of the flow rate detecting element 51 by a heat-curing addition-reaction silicone adhesive 60 functioning as an elastic adhesive. The sealant 58 which is composed of a heat-curing addition-reaction gel containing a fluorine resin as a major constituent (SIFEL 860, registered trademark of Shin-Etsu Chemical Co., Ltd., for example) is injected and cured inside the peripheral wall member 56 so as to embed the electrical connection portion 57 as shown in FIG. 5.

The holder 49 with the flow rate detecting element 51 mounted in this manner is mounted to the columnar member 46 so as to be accommodated inside the holder accommodating aperture 46a such that the detector auxiliary portion 50 at the first end of the holder 49 is made to project into the detector passage 47. Here, the detector auxiliary portion 50 passes through a central axis of the detector passage 47 (aligned with the direction of flow of the fluid being measured in a direction perpendicular to the surface of the page in FIG. 2), being disposed so as to divide the passage cross section of the detector passage 47 perpendicular to the central axis into two sections. The major surface of the detector auxiliary portion 50, in other words, the major surface of the flow rate detecting element 51, is substantially parallel to the central axis of the detector passage 47, the flow rate detection resistor 53 being positioned at the position of the central axis of the detector passage 47.

Second ends of the insert-molded terminals 48 projecting from the holder 49 are electrically connected to the circuit board 43. The electronic components mounted to the circuit board 43 constitute a control circuit for controlling the electric current flowing to the flow rate detection resistor 53, etc.

The flow rate sensor 42 constructed in this manner is mounted to the main passage 40 by inserting the columnar member 46 though the mounting aperture 41 so as to project inside the main passage 40 and securing the circuit case 44 to an outer wall of the main passage 40 by a screw (not shown). Here, the central axis of the detector passage 47 is substantially aligned with the central axis of the main passage 40.

The fluid being measured flowing through the inside of the main passage 40 is directed inside the detector passage 47 and flows over the surface of the flow rate detecting element 51. The electric current flowing to the flow rate detection resistor 53 is controlled by the control circuit mounted to the circuit board 43 such that the average temperature of the flow rate detection resistor 53 is a predetermined amount higher than the temperature of the fluid being measured as detected by the temperature-compensating resistor 54. The flow rate of the fluid being measured flowing through the inside of the main passage 40 is detected by extracting this electric current as a detected flow rate signal.

In this flow rate sensor 42, because the frame-shaped peripheral wall member 56 disposed so as to surround the outer circumference of the electrical connection portion 57 is secured by bonding the entire surface of the bottom surface 56a thereof to the major surfaces of the thin portion 49a which is a portion of the holder 49 and the detector auxiliary portion 50 and the major surface of the silicon substrate 52 by the silicone adhesive 60 functioning as an elastic adhesive, gaps do not arise between the peripheral wall member 56 and the holder 49 or between the peripheral wall member 56 and the silicon substrate 52. Thus, the sealant 58 is prevented from leaking out of the peripheral wall member 56 and adhering to the surfaces of the silicon substrate 52 and the detector auxiliary portion 50 outside the peripheral wall member 56.

Because the bottom surface 56a of the peripheral wall member 56 is formed into a flat surface, application of the silicone adhesive 60 is facilitated, enabling automation of the manufacturing process.

Because the entire surface of the bottom surface 56a of the peripheral wall member 56 is fixed by the silicone adhesive 60 which is an elastic adhesive, even if there are some irregularities on the bottom surface 56a, the silicone adhesive 60 embeds the irregularities, suppressing the formation of gaps. Consequently, because it is not necessary to control the dimensional precision of the peripheral wall member 56 with high precision and the bottom surface 56a of the peripheral wall member 56 does not have a three-dimensional shape, mass production is improved, enabling production costs to be reduced.

Because the silicone adhesive 60 is an adhesive curing by a heat-curing addition reaction, it does not contain organo-metallic salts or organic peroxides. Thus, the addition reaction by the platinum catalyst is no longer obstructed when the sealant 58 is curing, eliminating the occurrence of curing failure in the sealant 58. Consequently, uncured oily sealant 58, which leaks easily, is eliminated, preventing the sealant 58 from leaking out of the peripheral wall member 56.

Because the silicone adhesive 60 and the sealant 58 both cure by heat-curing addition reactions, the silicone adhesive 60 and the sealant 58 can be cured by a single heating process after bonding the peripheral wall member 56 using the silicone adhesive 60 then injecting the sealant 58 inside the peripheral wall member 56, enabling manufacturing costs to be reduced.

Because a heat-curing addition-reaction gel containing a fluorine resin as a major constituent is used for the sealant 58, compared to the silicone gel, there are very few oil components which do not contribute to curing. Thus, the amount of oil component remaining in the sealant 58 after heat curing is greatly reduced, preventing the sealant 58 from leaking out of the peripheral wall member 56.

The chemical resistance and environmental tolerance of the fluorine resin are significantly higher than for silicone resins, and because deterioration by gasoline in particular is very low, the present flow rate sensor is particularly suitable for application to flow rate sensors for gasoline internal combustion engines.

In addition, silicone resins are easily swelled by chemicals, etc., deformation and deterioration after swelling being significant, but fluorine resins do not exhibit this kind of aging, and therefore the sealant 58 containing the fluorine resin as a major constituent will not leak out onto the silicon substrate 52 or the detector auxiliary portion 50.

The flow rate detecting element 51 is secured by bonding to the detector auxiliary portion 50 using an epoxy adhesive 61. Because this epoxy adhesive 61 uses a phenol curing agent, amine curing agents which inhibit the addition reaction by the platinum catalyst during the heat curing of the sealant 58 are eliminated, preventing the occurrence of curing failure in the sealant 58 and therefore the sealant 58 will not leak out onto the silicon substrate 52 or the detector auxiliary portion 50.

Hence, according to Embodiment 1, because the sealant 58 is prevented from leaking out and adhering to the silicon substrate 52 and the detector auxiliary portion 50 outside the peripheral wall member 56, a flow rate sensor enabling accurate flow rate detection and also enabling deterioration in responsiveness to be suppressed can be achieved.

Now, in Embodiment 1 above, the heat-curing addition-reaction silicone adhesive 60 is used as the elastic adhesive securing the bottom surface 56a of the peripheral wall member 56 by bonding to the holder 49 and the flow rate detecting element 51, but the elastic adhesive is not limited to the heat-curing addition-reaction silicone adhesive 60, it may be any adhesive not containing organic metals or organic peroxides inhibiting the addition reaction of the sealant by the platinum catalyst, in other words, any heat-curing addition-reaction adhesive; for example, TSE 322 (registered trademark of GE Toshiba Silicones Co., Ltd.), KE 1843 (registered trademark of Shin-Etsu Chemical Co., Ltd.), X-32-1964 (registered trademark of Shin-Etsu Chemical Co., Ltd.), etc., can be used.

A heat-curing addition-reaction gel containing a fluorine resin as a major constituent is used for the sealant 58, but a heat-curing addition-reaction rubber containing a fluorine resin as a major constituent (SIFEL 611, registered trademark of Shin-Etsu Chemical Co., Ltd., for example) may also be used.

Although chemical resistance and environmental tolerance are inferior compared to the gel containing a fluorine resin as a major constituent, a heat-curing addition-reaction gel or rubber containing a silicone resin as a major constituent can be used for the sealant 58, depending on the intended use.

An epoxy adhesive 61 having a phenol curing agent such as a phenol novolac is used, but the curing agent for the epoxy adhesive may be any curing agent not containing amine substances; for example, acid anhydride curing agents such as phthalic anhydride, trimellitic anhydride, etc., catalytic curing agents such as imidazole, tertiary amine, etc., or latent curing agents such as dicyandiamide, Lewis acid complexes, etc., can be used.

Moreover, in Embodiment 1 above, the flow rate detection resistor 53 and the temperature-compensating resistor 54 are formed in combination on the silicon substrate 52 of the flow rate detecting element 51. In this case, a heat insulation means (not shown) is applied to the silicon substrate 52 so that heat from the flow rate detection resistor 53 is not transferred to the temperature-compensating resistor 54.

The temperature-compensating resistor 54 does not necessarily have to be formed on the silicon substrate 52; the flow rate detection resistor 53 may be formed on the silicon substrate 52 alone.

The substrate on which the flow rate detection resistor 53 and the temperature-compensating resistor 54 is formed is not limited to the silicon substrate 51; any electrical insulator such as a ceramic, etc., can be used.

In addition, the material constituting the flow rate detection resistor 53 and the temperature-compensating resistor 54 is not limited to platinum; nickel or a nickel-iron alloy (such as permalloy, trademark of the Western Electric Company) can be used, for example.

The flow rate sensor 42 is constituted by a separate member from the main passage 40, but a flow rate sensor and the main passage 40 may be constructed integrally.

The present invention is constructed in the above manner and exhibits the effects described below.

According to one aspect of the present invention, there is provided a flow rate sensor including:

a holder at a first end of which a flat detector auxiliary portion is formed integrally, an element accommodating recess portion being formed in a major surface of the detector auxiliary portion;

a flat flow rate detecting element for detecting a flow rate of a fluid being measured, the flow rate detecting element being mounted to the holder so as to be housed inside the element accommodating recess portion such that a major surface of the flow rate detecting element is positioned in a common plane with a major surface of the detector auxiliary portion;

a circuit board to which a control circuit for controlling an electric current flowing to the flow rate detecting element is mounted;

a terminal built into the holder such that a second end of the terminal is electrically connected to the circuit board, a first end of the terminal being positioned in a common plane with the major surface of the detector auxiliary portion and extending onto the detector auxiliary portion;

a frame-shaped peripheral wall member mounted to the holder so as to surround an electrical connection portion formed by electrically connecting an electrode portion formed at a first end of the terminal of the flow rate detecting element and the first end of the terminal; and a heat-curing addition-reaction sealant injected inside the peripheral wall member so as to embed the electrical connection portion, wherein a bottom surface of the peripheral wall member is secured by bonding to the detector auxiliary portion and the flow rate detecting element by an elastic adhesive.

Thus, because gaps do not arise between the peripheral wall member and the holder and leakage of the sealant injected inside the peripheral wall member is prevented, a flow rate sensor enabling accurate flow rate detection and also enabling deterioration in responsiveness to be suppressed is achieved. Furthermore, because the bottom surface of the peripheral wall member is formed into a flat surface, application of the elastic adhesive is facilitated, facilitating automation of the manufacturing process. In addition, because the elastic adhesive acts to fill irregularities on the bottom surface of the peripheral wall member, the occurrence of gaps between the peripheral wall member and the holder can be reliably suppressed and it is no longer necessary to control the dimensional precision of the peripheral wall member strictly, enabling production costs to be reduced.

The elastic adhesive may be a heat-curing addition-reaction adhesive, whereby the elastic adhesive does not contain organometallic salts and organic peroxides which inhibit curing of the sealant, reducing the amount of oil components remaining in the cured sealant, thereby preventing leakage of the sealant. In addition, the elastic adhesive and the sealant can be simultaneously cured by a single heat curing process, enabling simplification of the manufacturing process, thereby enabling production costs to be reduced.

According to another aspect of the present invention, there is provided a flow rate sensor including:

a holder at a first end of which a flat detector auxiliary portion is formed integrally, an element accommodating recess portion being formed in a major surface of the detector auxiliary portion;

a flat flow rate detecting element for detecting a flow rate of a fluid being measured, the flow rate detecting element being mounted to the holder so as to be housed inside the element accommodating recess portion such that a major surface of the flow rate detecting element is positioned in a common plane with a major surface of the detector auxiliary portion;

a circuit board to which a control circuit for controlling an electric current flowing to the flow rate detecting element is mounted;

a terminal built into the holder such that a second end of the terminal is electrically connected to the circuit board, a first end of the terminal being positioned in a common plane with the major surface of the detector auxiliary portion and extending onto the detector auxiliary portion;

a frame-shaped peripheral wall member mounted to the holder so as to surround an electrical connection portion formed by electrically connecting an electrode portion formed at a first end of the terminal of the flow rate detecting element and the first end of the terminal; and a sealant injected inside the peripheral wall member so as to embed the electrical connection portion, wherein the sealant is constituted by a heat-curing addition-reaction gel or rubber containing a fluorine resin as a major constituent. Thus, because the chemical resistance and environmental tolerance of the sealant are superior and leakage of the sealant resulting from aging is prevented, a flow rate sensor enabling accurate flow rate detection and also enabling deterioration in responsiveness to be suppressed is achieved.

A bottom surface of the peripheral wall member may be secured by bonding to the detector auxiliary portion and the flow rate detecting element by a heat-curing addition-reaction elastic adhesive, whereby gaps do not arise between the peripheral wall member and the holder, thereby preventing leakage of the sealant injected inside the peripheral wall member. Furthermore, the elastic adhesive does not contain organometallic salts and organic peroxides which inhibit curing of the sealant, reducing the amount of oil components remaining in the cured sealant, thereby preventing leakage of the sealant. In addition, the elastic adhesive and the sealant can be simultaneously cured by a single heat curing process, enabling simplification of the manufacturing process, thereby enabling production costs to be reduced.

The flow rate detecting element may be secured by bonding to a bottom surface of the element accommodating recess portion by an adhesive containing as a major constituent an epoxy resin using a curing agent not containing amine substances, whereby an addition reaction by a platinum catalyst is not obstructed during curing of the sealant, reducing the amount of oil components remaining in the sealant as a result of curing failure, thereby preventing leakage of the sealant.

The curing agent may be a phenol curing agent, whereby the addition reaction by the platinum catalyst is not obstructed during curing of the sealant, reducing the amount of oil components remaining in the sealant as a result of curing failure, thereby preventing leakage of the sealant.

The curing agent may be an acid anhydride curing agent, whereby the addition reaction by the platinum catalyst is not obstructed during curing of the sealant, reducing the amount of oil components remaining in the sealant as a result of curing failure, thereby preventing leakage of the sealant.

The curing agent may be a catalytic curing agent, whereby the addition reaction by the platinum catalyst is not obstructed during curing of the sealant, reducing the amount of oil components remaining in the sealant as a result of curing failure, thereby preventing leakage of the sealant.

The curing agent may be a latent curing agent, whereby the addition reaction by the platinum catalyst is not obstructed during curing of the sealant, reducing the amount of oil components remaining in the sealant as a result of curing failure, thereby preventing leakage of the sealant.

What is claimed is:

1. A flow rate sensor comprising:
    a holder at a first end of which a flat detector auxiliary portion is formed integrally, an element accommodating recess portion being formed in a major surface of said detector auxiliary portion;
    a flat flow rate detecting element for detecting a flow rate of a fluid being measured, said flow rate detecting element being mounted to said holder so as to be housed inside said element accommodating recess portion such that a major surface of said flow rate detecting element is positioned in a common plane with a major surface of said detector auxiliary portion;
    a circuit board to which a control circuit for controlling an electric current flowing to said flow rate detecting element is mounted;
    a terminal built into said holder such that a second end of said terminal is electrically connected to said circuit board, a first end of said terminal being positioned in a common plane with said major surface of said detector auxiliary portion and extending onto said detector auxiliary portion;
    a frame-shaped peripheral wall member mounted to said holder so as to surround an electrical connection portion formed by electrically connecting an electrode portion formed at a first end of said terminal of said flow rate detecting element and said first end of said terminal; and
    a heat-curing addition-reaction sealant injected inside said peripheral wall member so as to embed said electrical connection portion,
    wherein a bottom surface of said peripheral wall member is secured by bonding to said detector auxiliary portion and said flow rate detecting element by an elastic adhesive.

2. The flow rate sensor according to claim 1 wherein said elastic adhesive is a heat-curing addition-reaction adhesive.

3. The flow rate sensor according to claim 1 wherein said flow rate detecting element is secured by bonding to a bottom surface of said element accommodating recess portion by an adhesive containing as a major constituent an epoxy resin using a curing agent not containing amine substances.

4. The flow rate sensor according to claim 3 wherein said curing agent is a phenol curing agent.

5. The flow rate sensor according to claim 3 wherein said curing agent is an acid anhydride curing agent.

6. The flow rate sensor according to claim 3 wherein said curing agent is a catalytic curing agent.

7. The flow rate sensor according to claim 3 wherein said curing agent is a latent curing agent.

8. A flow rate sensor comprising:
    a holder at a first end of which a flat detector auxiliary portion is formed integrally, an element accommodating recess portion being formed in a major surface of said detector auxiliary portion;
    a flat flow rate detecting element for detecting a flow rate of a fluid being measured, said flow rate detecting element being mounted to said holder so as to be housed inside said element accommodating recess portion such that a major surface of said flow rate detecting element is positioned in a common plane with a major surface of said detector auxiliary portion;
    a circuit board to which a control circuit for controlling an electric current flowing to said flow rate detecting element is mounted;
    a terminal built into said holder such that a second end of said terminal is electrically connected to said circuit board, a first end of said terminal being positioned in a common plane with said major surface of said detector auxiliary portion and extending onto said detector auxiliary portion;
    a frame-shaped peripheral wall member mounted to said holder so as to surround an electrical connection portion formed by electrically connecting an electrode portion formed at a first end of said terminal of said flow rate detecting element and said first end of said terminal; and
    a sealant injected inside said peripheral wall member so as to embed said electrical connection portion,
    wherein said sealant is constituted by a heat-curing addition-reaction gel or rubber containing a fluorine resin as a major constituent.

9. The flow rate sensor according to claim 8 wherein a bottom surface of said peripheral wall member is secured by bonding to said detector auxiliary portion and said flow rate detecting element by a heat-curing addition-reaction elastic adhesive.

10. The flow rate sensor according to claim 8 wherein said flow rate detecting element is secured by bonding to a bottom surface of said element accommodating recess portion by an adhesive containing as a major constituent an epoxy resin using a curing agent not containing amine substances.

11. The flow rate sensor according to claim 10 wherein said curing agent is a phenol curing agent.

12. The flow rate sensor according to claim 10 wherein said curing agent is an acid anhydride curing agent.

13. The flow rate sensor according to claim 10 wherein said curing agent is a catalytic curing agent.

14. The flow rate sensor according to claim 10 wherein said curing agent is a latent curing agent.

* * * * *